(12) United States Patent
Huang et al.

(10) Patent No.: US 10,264,496 B2
(45) Date of Patent: Apr. 16, 2019

(54) ADAPTIVE CELL SELECTION IN HETEROGENEOUS NETWORKS

(71) Applicant: Telefonaktiebolaget LM Ericsson (publ), Stockholm (SE)

(72) Inventors: Vincent Huang, Sollentuna (SE); Asa Bertze, Spånga (SE); Steven Corroy, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 62 days.

(21) Appl. No.: 15/326,605

(22) PCT Filed: Aug. 15, 2014

(86) PCT No.: PCT/SE2014/050940
§ 371 (c)(1),
(2) Date: Jan. 16, 2017

(87) PCT Pub. No.: WO2016/024894
PCT Pub. Date: Feb. 18, 2016

(65) Prior Publication Data
US 2017/0223583 A1  Aug. 3, 2017

(51) Int. Cl.
*H04W 36/00* (2009.01)
*H04W 24/02* (2009.01)
(Continued)

(52) U.S. Cl.
CPC ....... *H04W 36/0072* (2013.01); *H04W 24/02* (2013.01); *H04W 24/08* (2013.01); *H04W 36/0094* (2013.01); *H04W 36/30* (2013.01)

(58) Field of Classification Search
CPC ............. H04W 36/0072; H04W 36/30; H04W 36/0094; H04W 24/08
See application file for complete search history.

(56) References Cited

U.S. PATENT DOCUMENTS 8,249,606 B1    8/2012  Neophytou et al.
2003/0128658 A1  7/2003  Walton et al.
(Continued)

FOREIGN PATENT DOCUMENTS

GB    2506888 A    4/2014

OTHER PUBLICATIONS

International Search Report, Application No. PCT/SE2014/050940, dated Apr. 13, 2015.
(Continued)

*Primary Examiner* — Muthuswamy G Manoharan
(74) *Attorney, Agent, or Firm* — Sage Patent Group

(57) ABSTRACT

A method of performing cell selection for a set of mobile terminals among at least two neighboring cells including a first and a second radio access node, respectively, includes acquiring a value of at least one property reflecting a network condition for each one of the mobile terminals, determining with which one of the first and second radio access nodes each of the mobile terminals initially should be associated based on the value of the acquired property for each mobile terminal, and generating a plurality of variations to the determined initial association based on a corresponding selected parameter. The method includes performing cell selection for at least a subset of the generated plurality of variations to the initial association, and determining a value of a metric for each of the performed cell selections and associating each metric value with said acquired property.

17 Claims, 3 Drawing Sheets

(51) Int. Cl.
   *H04W 24/08*    (2009.01)
   *H04W 36/30*    (2009.01)

(56) References Cited

U.S. PATENT DOCUMENTS

| | | | | |
|---|---|---|---|---|
| 2008/0227453 A1* | 9/2008 | Somasundaram | .... | H04W 48/20 455/436 |
| 2009/0252113 A1* | 10/2009 | Take | ..... | H04W 36/30 370/331 |
| 2009/0296640 A1 | 12/2009 | Gilbert | | |
| 2010/0008295 A1* | 1/2010 | Ji | ..... | H04W 48/20 370/328 |
| 2013/0188503 A1* | 7/2013 | Anepu | ..... | H04W 24/10 370/252 |
| 2013/0272170 A1* | 10/2013 | Chatterjee | ..... | H04W 28/02 370/280 |
| 2014/0185523 A1* | 7/2014 | Davydov | ..... | H04W 76/27 370/328 |

OTHER PUBLICATIONS

Written Opinion of the International Searching Authority, Application No. PCT/SE2014/050940, dated Apr. 13, 2015.

Corroy et al., "Semidefinite Relaxation and Randomization for Dynamic Cell Association in Heterogeneous Networks", *2012 IEEE Global Communication Conference (GLOBECOM)*, Dec. 3-7, 2012, pp. 2397-2402.

\* cited by examiner

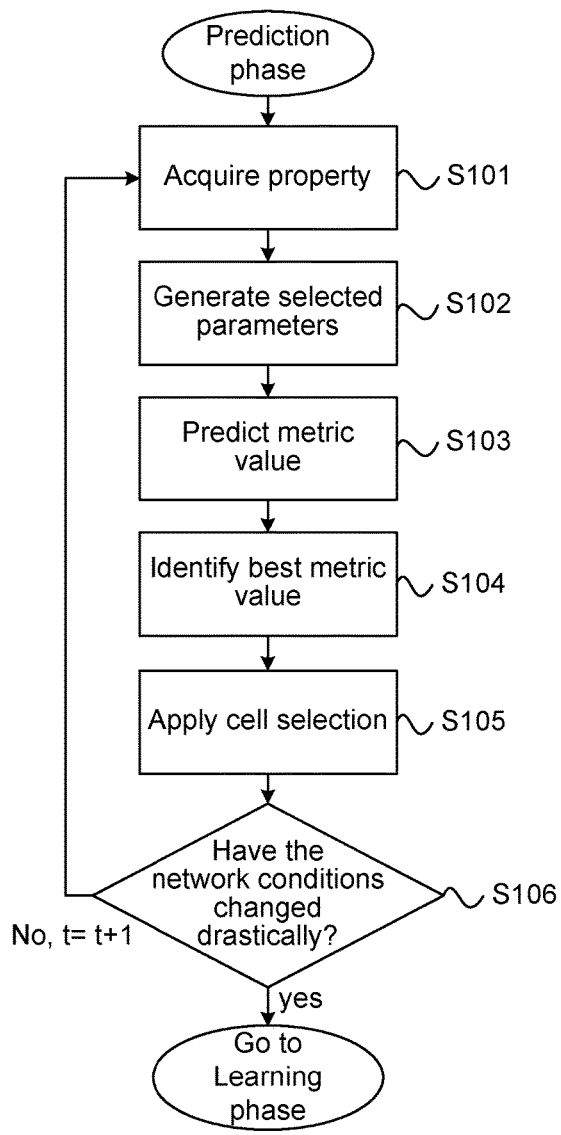
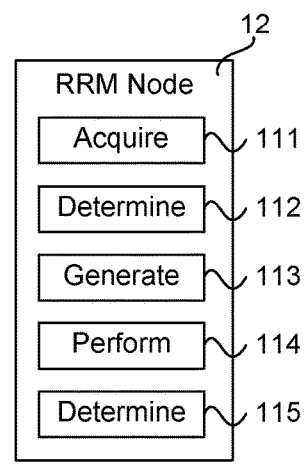
Fig. 4
Fig. 5

ADAPTIVE CELL SELECTION IN HETEROGENEOUS NETWORKS

CROSS REFERENCE TO RELATED APPLICATION

This application is a 35 U.S.C. § 371 national stage application of PCT International Application No. PCT/SE2014/050940, filed on Aug. 15, 2014, the disclosure and content of which is incorporated by reference herein in its entirety. The above-referenced PCT International Application was published in the English language as International Publication No. WO 2016/024894 A1 on Feb. 18, 2016.

TECHNICAL FIELD

The invention relates to a method and a network node for performing cell selection. The invention further relates to a computer program performing the method according to the present invention, and a computer program product comprising computer readable medium having the computer programs embodied therein.

BACKGROUND

A common approach for increasing throughput for mobile terminals in a cellular network is to deploy more and more base stations, thereby increasing the available bandwidth. In other words, in geographical areas with many mobile terminals, increasing the base station density would facilitate serving all mobile terminals with a high data rate in a given area. Although this approach could theoretically provide significant rate improvements, it has two main problems; 1) it is very expensive, both in cost and in time, and 2) today's cities are already saturated with base stations and people are more and more reluctant to tolerate further base stations in the cities because of electromagnetic emission.

The most promising and practical approach, which provides a fast deployable and cost efficient solution, is heterogeneous networks (HetNets). The concept is very simple; the idea is to deploy smaller base stations in areas where the data requirements are the highest in order to provide a good service even in crowded geographical areas, where it is not possible to deploy more standard base stations. These smaller base stations are much cheaper and transmit with a significantly lower power. It enables a commercially viable deployment as well as taking health concerns into account.

There exist several types of base stations in HetNets.
Macro nodes: these are the standard base stations, as deployed nowadays. They consume the most energy, transmit with the highest power and can therefore serve mobile terminals at the furthest distance. They typically use a transmit power in the order of 40 W. They are designed to cover larger areas like city districts. The area served by a macro node is called a macro cell.
Pico nodes: these are smaller base stations, which are cheaper than macro nodes and have a significantly lower transmit power. They can serve UEs in much smaller geographical areas, e.g., a mall or a metro station, and are commonly referred to as a hotspot. Pico nodes typically use a transmit power in the order of 1 W. The area served by a pico node is called a pico cell.
Femto nodes: these are the smallest base stations. They are typically used to cover a small office or a house.

In current mobile communication networks, a mobile terminal is served by a macro node. If this mobile terminal moves too far from the macro node, it proceeds to a handover and simply changes its serving macro node. In a network with only macro nodes, the macro nodes are typically placed such that mobile terminals close to the centre of the macro cell experience little interference. Such communication networks are not very sensitive to poor cell selection schemes.

In HetNets on the contrary, the cell selection of mobile terminals plays a crucial role and is a fundamental problem to be solved for providing a successful HetNet deployment. Indeed, pico nodes are typically placed inside a macro cell to improve the data rate at specific locations. Since the macro node has a much higher transmit power than the pico node, the mobile terminals served by the pico node suffer a very large interference from the macro node. Associating the right mobile terminals to the right node is therefore a problem that cannot be treated as in standard mobile communication networks only relying on macro nodes.

When a mobile terminal wants to join the cellular network, it first has to find cells in its neighbourhood and then select which one of them it will be associated to. Cell-specific reference signals are sent periodically by the base stations and are used by the mobile terminals to estimate their channel quality, i.e., the power received from the base station. These reference signals are known in advance at the mobile terminal and can be used, for example to calculate the reference signal received power (RSRP), which is basically the average received power of the reference signal transmitted by the base station to the mobile terminal per transmitted resource element. The role of the cell selection algorithm is to decide which cell to connect to, based on such measurements performed on the cells within range for the mobile terminal.

Typically, cell selection occurs periodically, e.g., when channel conditions have changed, and also based on network churn, i.e., when a mobile terminal enters or leaves a cell.

There exist two main approaches to this problem that are currently being implemented in Long Term Evolution (LTE) Advanced networks.

The RSRP approach is the simplest method for associating mobile terminals to base stations. At the time a mobile terminal needs to be associated to a base station, it measures the received power from each of its neighbouring base stations. The mobile terminal is then associated to the base station with the largest received power. This algorithm has been used in Universal Mobile Telecommunications System (UMTS) and is still used in LTE. Its strength is its conceptual simplicity as well as its profoundly decentralized nature. Indeed, it only requires for the mobile terminals to measure the received power values and to report the largest to the network. For macro-only networks, this method has proven very efficient and is the corner stone of today's cell selection algorithms.

In HetNets however, the RSRP method suffers from the transmit power asymmetry between nodes. Since a macro node has a much larger transmit power than a pico node, most mobile terminals will experience a larger received power from the macro node. This leads to a strong load imbalance between the macro nodes and the pico nodes, leaving the pico nodes underutilized. To make the best use of the increase in available bandwidth provided by the pico node, a more balanced distribution of mobile terminals is desired. A pico node will not live up to its full potential in densely populated areas if most of the users are still associated with macro nodes.

To tackle the main problem of the RSRP method, while preserving its simplicity, the so called Cell Range Extension (CRE) method was introduced. Considering a best Signalto-Noise-Ratio (SNR) heuristic, all mobile terminals which receive their largest received power from a certain node can be said to be in its range. If the most remotely located mobile terminal that is still in the range of this node is identified, the distance of the mobile terminal from the base station is interpreted as a radius, and a circular area is imagined with this radius and the base station as a centre, a so-called range area of this base station is attained, and any mobile terminal within the range area will be associated to the base station.

Clearly, in a HetNet, the range of a pico node is rather small, since its transmit power is small compared to the one of neighbouring macro nodes. The main idea of the CRE method is to virtually increase the range of the pico nodes by a fixed factor. The difference with the RSRP method is that a mobile terminal only is associated to a macro node if its received power is better than the one of a pico node multiplied by the fixed extension factor.

The CRE method keeps the major advantage of simplicity from the RSRP method while enabling to balance the distribution of the users between the macro and pico nodes. This way the pico node is guaranteed to be serving a significant amount of mobile terminals. A drawback of this algorithm is that mobile terminals are not necessarily associated to the node with the largest received power possible. Consequently, a mobile terminal might experience a very poor SINR and therefore be incapable of receiving any data. Further, mobile terminals at the border of the macro and pico cells will receive a very large interference from the macro node, leading to a very poor throughput.

In general, the cell selection is performed more seldom than the resource allocation. In other words, the channel condition can vary a lot between occasions when mobile terminals are re-associated with base stations. Further, a mobile terminal might have a long data stream to transmit; so long that new mobile terminals enter and exit the network during this transmission. This could lead to completely different resource sharing distribution.

Existing cell selection schemes do not take into account changes in the channel and network conditions and only use knowledge pertaining to instantaneous physical properties, like for instance signal strength of the base station as received at the mobile terminals.

SUMMARY

An object of the present invention is to solve, or at least mitigate, the problem of performing cell selection in the art and thus to provide an improved approach for cell selection.

This object is attained in a first aspect of the present invention by a method of performing cell selection among at least two neighbouring cells for a set of mobile terminals in a communications network, where a first cell of the at least two neighbouring cells comprises a first radio access node having a first transmit power and a second cell of the at least two neighbouring cells comprises a second radio access node having a second transmit power. The method comprises acquiring a value of at least one property reflecting a network condition for each one of the mobile terminals in the set, determining with which one of the at least first and second radio access nodes each of the mobile terminals initially should be associated based on the value of the acquired property of each mobile terminal, and generating a plurality of variations to the determined initial association, wherein each generated variation is based on a corresponding selected parameter. The method further comprises performing cell selection for at least a subset of the generated plurality of variations to the determined initial association, and determining a value of a metric for each of the performed cell selections and associating each metric value with said acquired property and the selected parameters for each corresponding variation of each performed cell selection, which metric reflects performance for the set of mobile terminals for each performed cell selection, wherein cell selection subsequently can be performed based on the metric value and the associated acquired property and selected parameters.

This object is attained in a second aspect of the present invention by a radio resource management (RRM) node configured to perform cell selection among at least two neighbouring cells for a set of mobile terminals in a communications network, where a first cell of the at least two neighbouring cells comprises a first radio access node having a first transmit power and a second cell of the at least two neighbouring cells comprises a second radio access node having a second transmit power, the RRM node comprising a processing unit and a memory, which memory contains instructions executable by the processing unit, whereby the RRM node is operative to acquire a value of at least one property reflecting a network condition for each one of the mobile terminals in the set, to determine with which one of the at least first and second radio access nodes each of the mobile terminals initially should be associated based on the value of the acquired property of each mobile terminal, and to generate a plurality of variations to the determined initial association, wherein each generated variation is based on a corresponding selected parameter. Further, the RRM node is operative to perform cell selection for at least a subset of the generated plurality of variations to the determined initial association, and to determine a value of a metric for each of the performed cell selections and associating each metric value with the acquired property and the selected parameters for each corresponding variation of each performed cell selection, which metric reflects performance for the set of mobile terminals for each performed cell selection, wherein cell selection subsequently can be performed based on the metric value and the associated acquired property and selected parameters.

Further provided are a computer program performing the method according to the present invention, and a computer program product comprising computer readable medium having the computer programs embodied therein.

Advantageously, the present invention proposes to adaptively apply and modify a cell selection by taking into account network measurements in order to predict behaviour of the communications network and react appropriately.

An initial strategy for associating a set of mobile terminals in a communications network with a radio access node, such as a macro base station or a pico base station, is selected based on a value of a property of a network condition for each mobile terminal. This property may be embodied in the form of the SINR of the mobile terminals, an antenna rank of the mobile terminals, a number of mobile terminals in the network, etc.

Based on the acquired property, an initial strategy fo for associating the mobile terminals with the two base stations is determined. Hence, based on, e.g., the SINR of the established communication channel for each of the mobile terminals in the network, it is determined with which one of the macro base station and the pico base station each one of the mobile terminals initially should be associated. This will be used as a starting point for a subsequent cell selection. The selected initial association may vary greatly depending on the actual channel conditions, and may be slightly different from time slot to time slot. The approach used for performing the association may, e.g., be the previously described RSRP or CRE, depending on the circumstances.

Thereafter, a plurality of variations $f_1, f_2, \ldots, f_n$ are generated to the determined initial association $f_0$, where each generated variation is based on a selected parameter $x_1, x_2, \ldots, x_n$.

In an example, the initial basic strategy selected is the RSRP approach with a particular mobile terminal association to the macro base station and the pico base station depending on the measured SINR of each mobile terminal. In this example, the selected parameters $x_1, x_2, \ldots, x_n$ causing the variations $f_1, f_2, \ldots, f_n$ to the initial association fo consist in moving a number of mobile terminals with lowest SINR from one node to another.

A basic idea of the method according to embodiments of the present invention is to explore a set of possible cell selection strategies in a learning phase without having to test each possible selection. The variations $f_1, f_2, \ldots, f_n$ applied to the initial association fo are reproducible and preferably expert-knowledge based.

Thus, the variations $f_1, f_2, \ldots, f_n$ are made to the initial association fo and a goal is to find a value of a metric m that results in a best performance by selecting the parameters $x_1, x_2, \ldots, x_n$ and subsequently performing cell selection for a subset of the variations. Hence, for the applied cell selection based on the particular variation(s) to the initial association, the value of the metric m is determined, which metric reflects performance for the mobile terminals for the performed cell selection. As an example, the metric could be embodied in the form of a sum of downlink data rate of all mobile terminals in a particular cell.

This metric value is stored along with a value of the previously acquired property (e.g., the SINR value) reflecting mobile terminal network conditions and the selected parameters $x_1, x_2, \ldots, x_n$ that were used for this particular cell selection, and is advantageously used to develop a model M that subsequently can be used in the prediction phase to determine the best cell selection given the prevailing network conditions.

Embodiments of the present invention will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 4 illustrates a flowchart of a prediction method in accordance with a further embodiment of the present invention; and FIG. 5 illustrates an RRM node according to an embodiment of the present invention.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
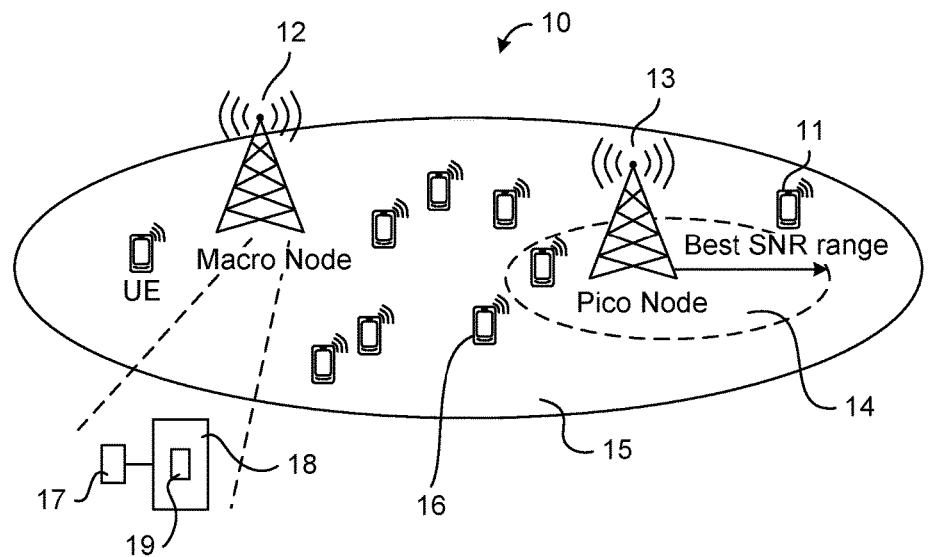
FIG. 1 illustrates a basic communications network in which the present invention can be implemented.

FIG. 1 illustrates a basic communications network 10 in which the present invention can be implemented. It should be noted that FIG. 1 is an illustration only to describe a basic idea of the present invention, and that a communications network in practice typically comprises many different network elements and nodes. FIG. 1 illustrates the previously discussed RSRP approach for associating mobile terminals to base stations. Hence, at the time a mobile terminal 11 needs to be associated to a base station, it measures the received power from each of its neighbouring base stations 12, 13. In this context, it should be noted that "neighbouring" base stations can imply two or more adjacently located base stations, which coverage areas may overlap or not, but also (as shown in FIG. 1) a second base station 13 whose coverage area 14 is completely encompassed by a greater coverage area 15 of a first base station 12, as is typically the situation in HetNets. The mobile terminal 11 is then associated to the base station 13 with largest received power. A problem in HetNets is that, e.g., mobile terminal 16 will experience a larger received power from the macro base station 12 than from pico base station 13, and will thus be associated with the macro base station 12 even if performance potentially would be better if the mobile terminal 16 instead would be associated with the pico base station 13.

With further reference to FIG. 1, the method of performing cell selection according to embodiments of the present invention is undertaken at a Radio Resource Management (RRM) node such as a Radio Base Station (RBS), a Radio Network Controller (RNC), an eNodeB, a NodeB, a Wireless Access Point (AP), etc., or any other appropriate radio access node in a wireless communications network. The RRM node will in the following be exemplified in the form of the macro base station 12, where the method is performed by a processing unit 17 embodied in the form of one or more microprocessors arranged to execute a computer program 19 downloaded to a suitable storage medium 18 associated with the microprocessor, such as a Random Access Memory (RAM), a Flash memory, or a hard disk drive. Thus, as is illustrated by means of dashed lines in FIG. 1, the processing unit 17 and the storage medium 18 are included in the macro base station 12. The processing unit 17 is arranged to carry out the method according to embodiments of the present invention when the appropriate computer program 19 comprising computer-executable instructions is downloaded to the storage medium 18 and executed by the processing unit 17. The storage medium 18 may also be a computer program product comprising the computer program 19. Alternatively, the computer program 19 may be transferred to the storage medium 18 by means of a suitable computer program product, such as a Digital Versatile Disc (DVD) or a memory stick. As a further alternative, the computer program 19 may be downloaded to the storage medium 18 over a network. The processing unit 17 may alternatively be embodied in the form of a digital signal processor (DSP), an application specific integrated circuit (ASIC), a field-programmable gate array (FPGA), a complex programmable logic device (CPLD), etc. Further, even though not shown in FIG. 1, the pico base station 13 typically comprises a corresponding processing unit and memory unit comprising a computer program executable by the processing unit.

Figure 2:
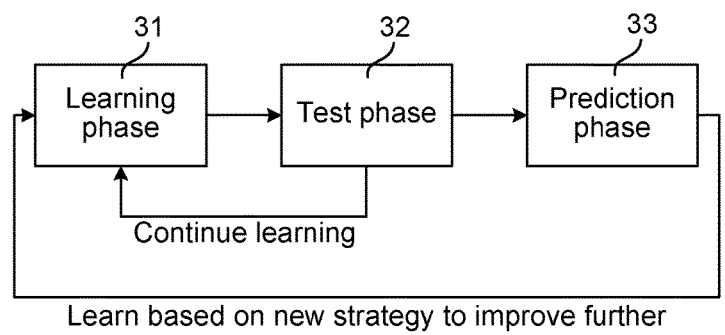
FIG. 2 illustrates an embodiment of the present invention.

FIG. 2 illustrates an embodiment of the present invention where an architecture for performing cell selection comprises a learning block 31, a test block 32, and a prediction block 33.

In a learning phase applied by the learning block 31, a specific basic cell selection strategy—such as RSRP or CRE—is used, but with a build-in variation based on a deterministic or probabilistic function. Thus, an initial association fo of mobile terminals to the base stations is assumed. The basic strategy is slightly different from time slot to time slot. The system associates the cell selection strategy (including the applied variation) with selected parameters to be discussed in the following and a metric reflecting performance, for evaluating a prediction model created by the learning block 31.

In a test phase applied by the test block 32, it is tested whether the prediction model from the learning block 31 generalizes well to new data. During a time period, the cell selection strategy applied in the learning phase is used and the result is compared to the predicted model. If the generalization error is sufficiently small, the prediction phase can be proceeded to. If not, the learning phase can be repeated, possibly by using test data, to improve the prediction model.

Finally, in a prediction phase, the initial association of mobile terminals to the base stations—i.e., the basic cell selection strategy—is changed based on results output from the learning block 31 and the test block 32. The prediction phase is typically the normal operating phase for the cell selection. At each cell selection time slot, the system is predicting the output metric for different variations of the basic strategies and chooses the best variation. As can be seen, results of the prediction phase can be reported back to the learning phase in order to improve quality of subsequent predictions. The reported result could even be used to update the basic strategy, i.e., the initial association. Thus, if a particular variation proves to be highly superior in most cases, then it can be made part of the basic strategy. Then the learning phase starts over.

In case the conditions in the network are rapidly changing, the prediction phase may report back to the learning phase more often to update the prediction model.

Figure 3:
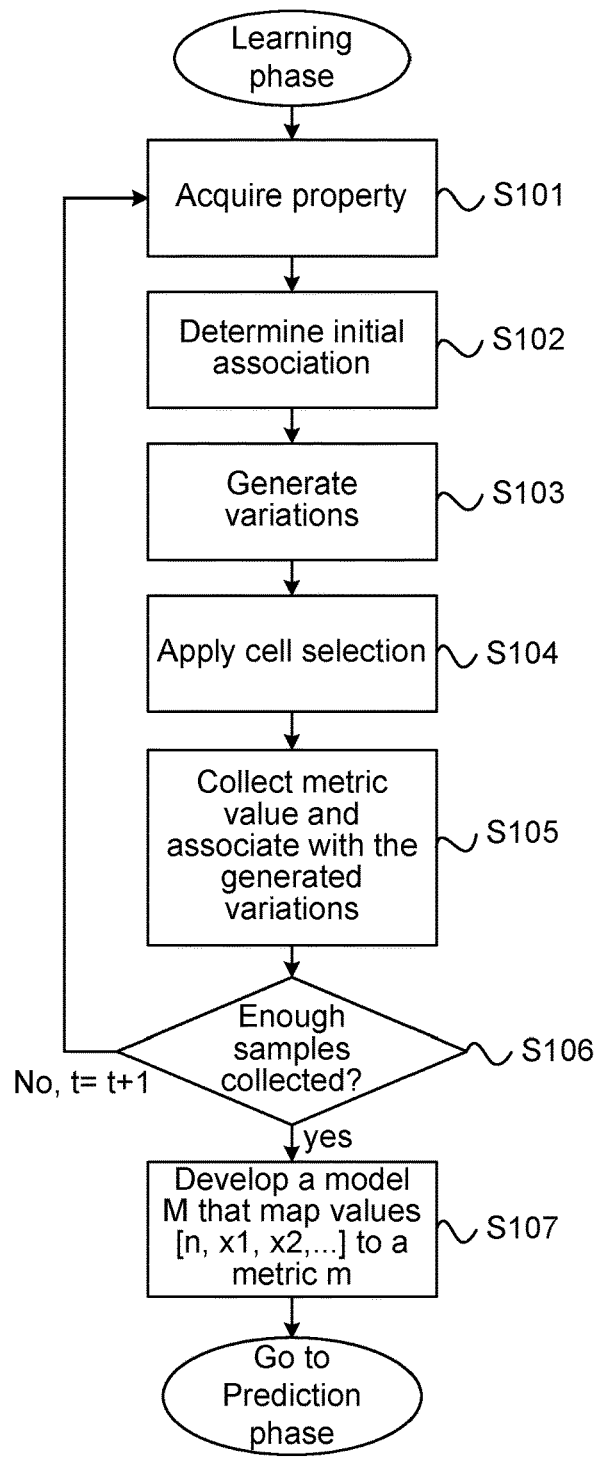
FIG. 3 illustrates a flowchart of a learning method in accordance with an embodiment of the present invention.

FIG. 3 illustrates a flowchart of a method undertaken at an appropriate RRM node, e.g., anyone or both of the macro base station 12 and the pico base station 13, or a supervising node such as an RNC (not shown), in accordance with an embodiment of the present invention, and which will be described in the following also with reference to structural elements of FIGS. 1 and 2. As can be seen in FIG. 3, this is referred to as the learning phase as was briefly discussed with reference to FIG. 2. Thus, in an embodiment of the present invention, an initial strategy for associating the mobile terminals of network 10 with the macro base station 12 and the pico base station 13 is selected based on a value of a property of a network condition for each mobile terminal. This property may be embodied in the form of an SINR of the mobile terminals, an antenna rank of the mobile terminals, a number of mobile terminals in the network, etc., and will be discussed in more detail in the following. As an example, a property such as an SINR is acquired in step S101 for each mobile terminal 11 and the respective macro and pico base station 12, 13, and all the other mobile terminals to be associated with the base stations 12, 13.

Based on the acquired property, an initial strategy fo for associating the mobile terminals with the two base stations 12, 13 is determined. Hence, based on, e.g., the SINR of the established communication channel for each of the mobile terminals in the network 10, it is determined with which one of the macro base station 12 and the pico base station 13 each one of the mobile terminals initially should be associated in step S102. This will be used as a starting point for a subsequent cell selection. The selected initial association may vary greatly depending on the actual channel conditions, and may be slightly different from time slot to time slot. The approach used for performing the association may, e.g., be the previously described RSRP or CRE, depending on the circumstances.

Thereafter, a plurality of variations $f_1, f_2, \ldots, f_n$ are generated to the determined initial association $f_0$ in step S103, where each generated variation is based on a selected parameter $x_1, x_2, \ldots, x_n$.

In a simple example, the initial basic strategy selected is the RSRP approach with a particular mobile terminal association fo to the macro base station 12 and the pico base station 13 depending on the measured SINR of each mobile terminal. In this example, the selected parameters $x_1, x_2, \ldots, x_n$ causing the variations $f_1, f_2, \ldots, f_n$ to the initial association fo consists in moving a number of mobile terminals with lowest SINR to their respective node from one node to another. Other parameters may be considered, such as the number of mobile terminals in the cells as well as their average SINR.

A basic idea of the method illustrated with reference to FIG. 3, i.e., the learning phase, is to explore a set of possible cell selection strategies without having to test each possible selection. Hence, for k mobile terminals and l base stations, it is undesirable to have to test $1^k$ different selections, learn how they perform and choose among them, as the effort would be to substantial. Further, in a real network, the number of mobile terminals varies since some mobile terminals undergo handovers and leave the cell, start and stop to transmit, and an update may have to be performed at each change of network conditions.

The variations $f_1, f_2, \ldots, f_n$ applied to the initial association fo are 1. Reproducible, i.e., although a specific parameter of the applied variations is chosen at random in the training phase, in a subsequent predictions phase, the variations can be reproduced by choosing the same parameter causing the variation. For example, if a variation f is caused by a parameter x embodied by moving a number of mobile terminals at random from the macro base station 12 and transfer them to the pico base station 13, then such a random variation is not reproducible. If instead a variation f is caused by a parameter x implemented by means of moving a number of mobile terminals with the lowest SINR at random from the macro base station 12 to the pico base station 13, then the variation is reproducible. Hence, during the prediction phase, the mobile terminals with lowest SINR are transferred from the macro base station 12 to the pico base station 13.

2. Expert-knowledge based, i.e., the variations are based on empirical evaluations undertaken during the learning phase (and possibly the test phase) such that it is ensured that the variation improves network performance for a given scenario.

Thus, reverting to step S102, where an initial association $f_0$—i.e., a basic cell selection strategy—of mobile terminals to the macro base station 12 and the pico base station 13 is determined based on a property reflecting network conditions for the mobile terminals (exemplified in the form of the SINR), and step S103 where the variations $f_1, f_2, \ldots, f_n$ are generated.

The variations are represented by functions $f_1, f_2, \ldots, f_n$ using the selected parameters $x_1, x_2, \ldots, x_n$, respectively. For instance, the selected parameters may represent different numbers of mobile terminals that are moved from the macro base station 12 to the pico base station 13. Further, each function may have a binary weight $w_1, w_2, \ldots, w_n$, indicating whether a particular variation will be used or not.

Thus, variations $f_1, f_2, \ldots, f_n$ are made to the initial association fo in step S103:

$$m = f_0 + w_1 f_1(x_1) + w_2 f_2(x_2) + \ldots + w_n f_n(x_n) \quad (1),$$

and a goal is to find a value of metric m that results in a best performance by selecting the variables $x_1, x_2, \ldots, x_n$ and weights $w_1, w_2, \ldots, w_n$ and subsequently performing cell selection for a subset of the variations.

The choice of variables and weights is undertaken:
1. First, all $w_i$'s are set to 0,
2. For each i=n, wi is set to 1
3. During the learning phase, $x_i$ is selected at each time slot. In that way, network performance can be recorded for different values of $x_i$,
4. During the subsequent prediction phase, discussed in more detail further below, all possible values of $x_i$ that were generated in the learning phase are tested, and those resulting in a "best" metric are selected for each given situation,
5. After a certain period of time, the outcome of the prediction phase is evaluated, and the value for $x_i$ that that provides the best performance is selected. If the corresponding random variation fi has improved performance as compared to the initial association fo, $w_i$ is set to 1 (and otherwise to 0).
6. Now xi is fixed, and iterations are performed with $w_{i+1}$ and $x_{i+1}$ instead of $w_i$ and $x_i$. The new initial association is $f_0 + \Sigma_i w_i f_i(x_i)$, for all i.

Each generated variation $f_1, f_2, \ldots, f_n$ to the determined initial association $f_0$ (based on a selected parameter $x_1, x_2, \ldots, x_n$) is referred to as an exploration set:

$f_0 + w_1 f_1(x_1)$,
$f_0 + w_1 f_1(x_1) + w_2 f_2(x_2)$,
$w_1 f_1(x_1) + w_2 f_2(x_2) + w_3 f_3(x_3)$, and so on.

Note that the exploration set is much smaller than the set of all possible cell selections. Further, each new variation enables to explore a slightly larger set, leading to performance that increases gradually and converges to an optimal cell selection. It should further be noted that it is not necessary to explore new variations. Rather, if the achieved network performance is satisfactory, the iterative process described above may be stopped and the derived cell selection strategy may be used.

A number of selected parameters $x_1, \ldots, x_n$ causing the variations $f_1, \ldots, f_n$ can be envisaged, for instance:

Transfer a random number of mobile terminals with the lowest SINR from the macro base station 12 to the pico base station 13 to which the mobile terminals have their highest SINR. The number of mobile terminals to be transferred thus corresponds to one of the selected parameters $x_1, \ldots, x_n$, and is typically chosen between 0 and a maximum number configured by an operator of the network. Since the macro base station 12 has a much higher transmit power, a large number of mobile terminals are inevitably associated with it. It is thus important to transfer mobile terminals to the pico base station 13 in order to increase the available bandwidth. This variation is expected to result in a considerable performance increase.

Transfer a random number of mobile terminals with the lowest SINR from a highest loaded pico base station node to a next highest loaded pico base station. Hence, the number of mobile terminals to be transferred corresponds to one of the selected parameters $x_1, \ldots, x_n$, and is typically chosen between 0 and a maximum number configured by an operator of the network. Since a specific hotspot might be overloaded, an adjacently located pico base station may have available bandwidth and provide a significant rate improvement.

Switch a random number of mobile terminals having the greatest amount of data in their buffers from the pico base station 13 (several pico base stations are assumed) with mobile terminals from the macro base station 12 with the lowest SINR. The exchanged mobile terminals now associates with the pico base station, out of the several pico base stations, to which they have the best SINR. The number of mobile terminals to be switched corresponds to one of the selected parameters $x_1, \ldots, x_n$, and is typically chosen between 0 and a maximum number configured by an operator of the network. The rational behind this variation is that, even in a well-balanced network there are still problems with mobile terminals that have a full buffer of data to be transmitted, but which cannot be emptied because of a poor SINR. This variation enables transferring such mobile terminal to the best base station and thus freeing up bandwidth for the mobile terminals.

Note that these three variations can be used several times one after the other. For instance, assuming that for the first variation somewhere between 0 and 4 mobile terminals are transferred to the pico base station 13. If after the prediction phase it appears that 4 is the optimal value, then the first variation can be reused, and a parameter space of 4 to 8 can be explored. In that way it is possible to have a relatively short learning phase.

Now, again with reference to FIG. 3, as previously has been mentioned, in step S103 a first variation $f_1$ is generated by applying a first parameter $x_1$ consisting of moving one mobile terminal from the first cell 15 to the second cell 14, a second variation $f_2$ is generated by applying a second parameter $x_2$ consisting of moving two mobile terminal from the first cell 15 to the second cell 14, and so on. For a combination of the variations $f_1, f_2, \ldots, f_n$ to the initial association fo, a cell selection is performed in step S104. Hence, the cell selection may be performed based on any one or more the above mentioned explorations sets.

Proceeding to step S105, for the applied cell selection based on the particular variation(s) to the initial association of step S104, a value of a metric m is determined, which metric reflects performance for the mobile terminals for the performed cell selection. As an example, the metric could be embodied in the form of a sum of downlink data rate of all mobile terminals in a particular cell.

This metric value is stored along with a value of the previously acquired property (i.e., SINR value) denoted n, which reflects mobile terminal network conditions, of step S102 and the selected parameters $x_1, x_2, \ldots, x_n$ that were used for this particular cell selection, and is advantageously used to develop a model M that subsequently can be used in the prediction phase to determine the best cell selection given the prevailing network conditions.

In practice, a large number of metric values and associated variations and network conditions are required, denoted $[n(t), x_1(t), x_2(t), \ldots |m(t)]$ in step S105 of FIG. 4. The method may thus in an embodiment of the present invention proceed to step S106 were another iteration is performed in a subsequent time slot such that a further set of metric values and associated variations and network conditions can be determined and added in step S107 to a prediction model M. Thus, a model M has effectively been developed for various cell selections that maps the values $[n, x_1, x_2, \ldots]$ to the metric m, which mapping advantageously can be used for subsequently predicting the behavior of the communications network 10 and applying the cell selection caused by the particular variations to the initial cell selection strategy that results in a metric value reflecting the best performance. As an example, a cell selection caused by the variation of moving two mobile terminals from the macro cell 15 to the pico cell 14 could result in the highest mobile terminal downlink rate, so that particular variation to the initial cell selection strategy would be likely to subsequently be selected for a particular acquired property n.

In embodiments of the present invention, one or more properties reflecting various network conditions for the mobile terminals are used as input to the learning phase illustrated with reference to the flowchart of FIG. 3, as will be discussed in detail in the following The property n reflecting a network condition for the may comprise any one, or a combination of, the following properties:

The SINR of the mobile terminals in the cell: this parameter is important because the SINR has a great impact on achieved data rate. A low SINR typically results in a lower mobile terminal data rate. The mobile terminals can thus be divided into different SINR groups.

An antenna rank of the mobile terminals in the cell.

A number of mobile terminals in the cell: this parameter is important since it effectively stipulates how available bandwidth is shared among mobile terminals using the same base station. Typically, the more mobile terminals, the less bandwidth each mobile terminal is assigned.

A number of mobile terminals in the range of a specific base station. This property reflects geographical-dependent load of a specific base station and gives a hint on possible overload of certain base station.

A geometry statistics: the geometry statistic of a cell is the ratio of the wanted signal to the interference plus noise per sub-band. It is the equivalent of the SINR measure for the base stations. This property implies which base stations have a typically low SINR for the mobile terminals they server, and should consequently only be used by a few mobile terminal.

Previously attained metric values: this property may be interpreted to outline a general evolution of the attained metric, in order to determine which cell selection strategy should be used (in particular in case of a downward trend).

Previous values for SINR, rank, number of UEs, etc.: this property is important to understand the evolution of the network conditions and the impact on the attained metric similar to item 6.

A size of packets sent and amount of data in buffer for the mobile terminals: this property may be interesting for an indication on how long mobile terminals will stay in the network and thus consume network resources.

A type of traffic: this property may be used to indicate date rate requirements of mobile terminals and potentially their life time in the network.

A type of mobile terminal.

Further, a number of approaches can be utilized to develop the previously discussed prediction model M:

Linear regression;

Neural networks;

Support vector machines (SVMs); and

Random forest.

Again with reference to FIG. 2, the test phase performed by the test block 32 will be discussed in the following in some more detail. The goal of the test phase is to verify if the prediction model M developed in the learning phase and provided by the learning block 31 is accurate or not. Using the prediction model M output from the learning phase, the test phase continues to generate variation $f_1, f_2, \ldots, f_n$ to the basic strategy fo based on parameters $x_1, x_2, \ldots, x_n$. However, the test block 32 only measures at the beginning of a new cell selection time slot an error between the achieved output metric and the previously predicted metric value received from the learning block 31. If after a certain testing time, the error between the metric value from the learning block 31 and the metric value accomplished by the testing block 32 is small enough (e.g., smaller than a threshold set by the network operator) then the metric value from the learning block 31 is considered correct, and the process proceeds to the prediction phase. If not, the learning phase is reverted to, and the model M is improved either by obtaining more training data or by iteratively moving towards a more complex model that that is capable of capturing more complex dependencies. More specifically, the learning is based on several components, such as the learning algorithm, the properties used, a regularization parameter for limiting overfitting, number of training samples, etc.

FIG. 4 illustrates a flowchart of a method undertaken at an RRM node of the network 10 in accordance with an embodiment of the present invention. As can be seen in FIG. 4, this is referred to as the prediction phase, where the prediction model M elaborated during the learning phase is used by the macro base station 12 and/or the pico base station 13 to apply a cell selection giving the best predicted result for the mobile terminals of the network 10. In the following, the pico base station 13 will be used as an example. In a first step 201, the pico base station 13 acquires a value of one or more properties n(t) reflecting network conditions of the mobile terminals at time t. As can be realized, this step corresponds to step S101 of the learning phase illustrated in FIG. 3 and the purpose is to subsequently be able to predict the "best" value of the metric from the associations $[n, x_1, x_2, \ldots |m]$ that were stored in the learning phase and to apply a corresponding cell selection, as will be described.

As in the previous exemplifying embodiment of FIG. 3 illustrating the learning phase, this property may be realized in the form of the SINR of the mobile terminals, the antenna rank of the mobile terminals, the number of mobile terminals in the network, etc. In the next step S202, all possible parameters $x_1, x_2, \ldots, x_n$ are generated that were used for causing the variations $f_1, f_2, \ldots, f_n$ in the learning phase. These generated parameters may be stored in a list C.

As an example, if $x_1 \in \{0, 1, 2\}$ and $x_2 \in \{-1, 1\}$ then $C=[0,-1; 0,1; 1,-1; 1,1; 2,-1; 2,1]$.

Then, in step S203, for each element in C, and the acquired value of the property n(t) reflecting the network conditions, a value of the metric m is predicted using the prediction model M that was developed in the learning phase, i.e., by using the associations $[n, x_1, x_2, \ldots |m]$ that were created and stored in the learning phase.

Now, in step S204, the predicted metric value resulting in a desired, best performance for the set of mobile terminals is identified as well as, from the association $[n, x_1, x_2, \ldots |m]$, the corresponding combination of the selected parameters. In step S205, the cell selection corresponding to the identified combination of the selected parameters is applied in the network by generating the appropriate variation $f_1, f_2, \ldots, f_n$ to the determined initial association $f_0$, based on the desired combination of the selected parameters $x_1, x_2, \ldots, x_n$.

The prediction phase typically proceeds to a new cell selection timing slot in step S206 where a further iteration of the learning phase is undertaken for predicting a new value of the metric and to apply a corresponding cell selection. As can be seen, if network conditions changes dramatically, the predictions become inaccurate, and the learning phase must be reverted to in order to elaborate on a modified prediction model M better reflecting the actual network conditions.

FIG. 5 shows an RRM node 12 according to an embodiment of the present invention. The RRM node 12 comprises acquiring means 111 adapted to acquire a value of at least one property reflecting a network condition for each one of a set of mobile terminals for which cell selection is to be undertaken, determining means 112 adapted to determine with which one of at least a first and second radio access node, such as a radio base station, each of the mobile terminals initially should be associated based on the value of the acquired property of each mobile terminal, and generating means 113 adapted to generate a plurality of variations to a determined initial association, wherein each generated variation is based on a corresponding selected parameter. The RRM node 12 further comprises performing means 114 adapted to perform cell selection for at least a subset of the generated plurality of variations to the determined initial association, and determining means 115 adapted to determine a value of a metric for each of the performed cell selections and associating each metric value with said acquired property and the selected parameters for each corresponding variation of each performed cell selection, which metric reflects performance for the set of mobile terminals for each performed cell selection; wherein cell selection subsequently can be performed based on the metric value and the associated acquired property and selected parameters. Any one or more of the means 111-115 of the RRM node 12 may comprise a communications interface for receiving and providing information to other devices, and may further comprise a local storage for storing obtained and/or processed data. Moreover, any one or more of the means 111-115 of the RRM node 12 may (in analogy with the description given in connection to FIG. 1) be implemented by a processor embodied in the form of one or more microprocessors arranged to execute a computer program downloaded to a suitable storage medium associated with the microprocessor, such as a RAM, a Flash memory or a hard disk drive. The means may comprise one or more transmitters and/or receivers and/or transceivers, comprising analogue and digital components and a suitable number of antennae for radio communication.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of performing cell selection among at least two neighbouring cells for a set of mobile terminals in a communications network, wherein a first cell of the at least two neighbouring cells comprises a first radio access node having a first transmit power and a second cell of the at least two neighbouring cells comprises a second radio access node having a second transmit power, the method comprising:

acquiring a value of at least one property (n) reflecting a network condition for each one of the mobile terminals in the set;

determining with which one of the at least first and second radio access nodes each of the mobile terminals initially should be associated ($f_o$) based on the value of the acquired property for each mobile terminal, wherein the acquired property comprises at least a signal to noise ratio (SINR) of the mobile terminals, an antenna rank of the mobile terminals and a number of mobile terminals in the network;

generating a plurality of variations ($f_1, f_2, \ldots, f_n$) to the determined initial association ($f_0$), wherein the initial association is determined using at least one a Reference Signal Received Power (RSRP) method and a Cell Range Extension (CRE) method and be based on the value of the acquired property for each mobile terminal in the network, wherein each generated variation among the plurality of variations ($f_1, f_2, \ldots, f_n$) is based on a corresponding selected parameter ($x_1, x_2, \ldots, x_n$) that is related to the determined initial association ($f_o$), wherein the plurality of variations generated for the determined initial association ($f_0$) are variations that are reproduced by choosing a same parameter causing the variations and are based on empirical evaluations undertaken during a learning phase, wherein the selected parameter represents one or more mobile terminals with low SINR that are moved from one node to another, a number of mobile terminals in the cells, and an average SINR of the number of mobile terminals;

performing cell selection for at least a subset of the generated plurality of variations ($f_1, f_2, \ldots, f_n$) to the determined initial association ($f_o$); and determining a value of a metric ($m=f_0+w_1f_1(x_1)+\ldots$) for each of the performed cell selections and associating each metric value with said acquired property and the selected parameters for each corresponding variation of each performed cell selection ($[n, x_1, x_2, \ldots, |m]$), which metric reflects a performance for the set of mobile terminals for each performed cell selection, wherein cell selection subsequently is performed based on the metric value and the associated acquired property and selected parameters.

2. The method according to claim 1, wherein in case a further metric value is required, a further iteration is performed, in which case a further cell selection is performed for a new variation ($f_1, f_2, \ldots, f_n$) to the determined initial association ($f_0$) and said further metric value is determined for the performed further cell selection and associated with the acquired property and the selected parameters for each new variation.

3. The method according to claim 1, wherein the first transmit power is substantially greater than the second transmit power.

4. The method of claim 1, wherein said at least one property further comprises one or more of: a number of mobile terminals in the range of each radio access node, geometry statistics, previously attained metric values, a size of data packets sent, an amount of data buffered at the mobile terminals, a type of traffic, or a type of mobile terminals.

5. The method of claim 1, further comprising:

comparing, for a subsequent cell selection, the determined metric value to a new metric value attained in the subsequent cell selection time slot, wherein the determined metric value is considered accurate for use in case a difference between the determined metric value and the metric value of the subsequent cell selection time slot is below a threshold value.

6. The method of claim 1, further comprising:
acquiring the values of said at least one property reflecting a network condition for each one of the mobile terminals in the set;
generating all combinations of said selected parameters $(x_1, x_2, \ldots, x_n)$ on which said plurality of variations $(f_1, f_2, \ldots, f_n)$ is based;
predicting, for each combination of said selected parameters, a value of said metric $(m=f_0+w_1f_1(x_1)+ \ldots)$ using the association of each metric value with said acquired property and the selected parameters for each variation of each performed cell selection $([n, x_1, x_2, \ldots, |m])$;
identifying the predicted metric value resulting in a desired performance for the set of mobile terminals and, from said association, the corresponding combination of the selected parameters; and
performing the cell selection corresponding to the identified combination of the selected parameters.

7. The method according to claim 6, further comprising, in case the predicted metric is considered accurate:
acquiring a value of said at least one property;
generating all combinations of said selected parameters;
predicting a new value of said metric; and
identifying a new combination of the selected parameters resulting in a desired performance for which a new cell selection is applied.

8. The method according to claim 6, further comprising, in case the predicted metric is not considered accurate:
performing a further cell selection for a new variation $(f_1, f_2, \ldots, f_n)$ to the determined initial association $(f_0)$; and
determining said further metric value for the performed further cell selection and associating said further metric value with the acquired property and the selected parameters for each new variation for new prediction of a value of said metric.

9. A computer program product comprising a non-transitory computer readable storage medium storing computer-executable instructions for causing a device to perform operations according to claim 1 when the computer-executable instructions are executed on a processing unit included in the device.

10. A radio resource management, (RRM) node configured to perform cell selection among at least two neighbouring cells for a set of mobile terminals in a communications network, wherein a first cell of the at least two neighbouring cells comprises a first radio access node having a first transmit power and a second cell of the at least two neighbouring cells comprises a second radio access node having a second transmit power, the RRM node comprising a processing unit and a memory, said memory containing instructions executable by said processing unit, wherein the RRM node is configured to perform operations comprising:
acquiring a value of at least one property (n) reflecting a network condition for each one of the mobile terminals in the set;
determining with which one of the at least first and second radio access nodes each of the mobile terminals initially should be associated $(f_o)$ using at least one of a Reference Signal Received Power (RSRP) method and a Cell Range Extension (CRE) method and be based on the value of the acquired property for each mobile terminal,
wherein the acquired property comprises at least a signal to noise ratio (SINR) acquired by the mobile terminals, an antenna rank of the mobile terminals and a number of mobile terminals in the network;
generating a plurality of variations $(f_1, f_2, \ldots, f_n)$ to the determined initial association $(f_0)$, wherein the initial association is determined based on the value of the acquired property for each mobile terminal in the network, wherein each generated variation among the plurality of variations $(f_1, f_2, \ldots, f_n)$ is based on a corresponding selected parameter $(x_1, x_2, \ldots, x_n)$ that is related to the determined initial association $(f_o)$, wherein the plurality of variations generated for the determined initial association $(f_0)$ are variations that are reproduced by choosing a same parameter causing the variations and are based on empirical evaluations undertaken during a learning phase, wherein the selected parameter represents one or more numbers of mobile terminals with low SINR that are moved from one node to another, a number of mobile terminals in the cells, and an average SINR of the number of mobile terminals;
performing cell selection for at least a subset of the generated plurality of variations $(f_1, f_2, \ldots, f_n)$ to the determined initial association $(f_0)$; and
determining a value of a metric $(m=f_0+w_1f_1(x_1)+ \ldots)$ for each of the performed cell selections and associating each metric value with said acquired property and the selected parameters for each corresponding variation of each performed cell selection $([n, x_1, x_2, \ldots, |m])$, which metric reflects a performance for the set of mobile terminals for each performed cell selection,
wherein cell selection subsequently is performed based on the metric value and the associated acquired property and selected parameters.

11. The RRM node according to claim 10, wherein in case a further metric value is required, a further iteration is performed, in which case a further cell selection is performed for a new variation $(f_1, f_2, \ldots, f_n)$ to the determined initial association $(f_0)$ and said further metric value is determined for the performed further cell selection and associated with the acquired property and the selected parameters for each new variation.

12. The RRM node according to claim 10, wherein the first transmit power is substantially greater than the second transmit power.

13. The RRM node of claim 10, wherein said at least one property comprises one or more of: number of mobile terminals in the range of each radio access node, geometry statistics, previously attained metric values, size of data packets sent, amount of data in buffer of the mobile terminals, type of traffic, or type of mobile terminals.

14. The RRM node of claim 10, further being configured to perform operations comprising:
comparing, for a subsequent cell selection, the determined metric value to a new metric value attained in the subsequent cell selection time slot,
wherein the determined metric value is considered accurate for use in case a difference between the determined metric value and the metric value of the subsequent cell selection time slot is below a threshold value.

15. The RRM node of claim 10, further being configured to perform operations comprising:
acquiring the values of said at least one property reflecting a network condition for each one of the mobile terminals in the set;
generating all combinations of said selected parameters $(x_1, x_2, \ldots, x_n)$ on which said plurality of variations $(f_1, f_2, \ldots, f_n)$ is based;
predicting, for each combination of said selected parameters, a value of said metric $(m=f_0+w_1f_1(x_1)+ \ldots)$ using the association of each metric value with said acquired property and the selected parameters for each variation of each performed cell selection ($[n, x_1, x_2, \ldots, |m|]$);

identifying the predicted metric value resulting in a desired performance for the set of mobile terminals and, from said association, the corresponding combination of the selected parameters; and performing the cell selection corresponding to the identified combination of the selected parameters.

16. The RRM node according to claim 15, responsive to the predicted metric being considered accurate, performing operations comprising:

acquiring a value of said at least one property;

generating all combinations of said selected parameters;

predicting a new value of said metric; and identifying a new combination of the selected parameters resulting in a desired performance for which a new cell selection is applied.

17. The RRM node according to claim 15, responsive to the predicted metric being not considered accurate, performing operations comprising:

performing a further cell selection for a new variation ($f_1, f_2, \ldots, f_n$) to the determined initial association ($f_0$); and determining said further metric value for the performed further cell selection and associating said further metric value with the acquired property and the selected parameters for each new variation for new prediction of a value of said metric.

* * * * *